United States Patent [19]
Stone et al.

[11] Patent Number: 5,241,823
[45] Date of Patent: Sep. 7, 1993

[54] HYDRAULIC POWER SYSTEM HAVING FIRST AND SECOND POWER CONVERTERS

[75] Inventors: Stephen R. Stone, San Antonio, Tex.; Larry D. Nichols, Hot Springs Village, Ark.

[73] Assignee: Rineer Hydraulics, Inc., Corpus Christi, Tex.

[21] Appl. No.: 770,816

[22] Filed: Oct. 4, 1991

[51] Int. Cl.$^5$ .................... F16D 39/00; F01B 13/06
[52] U.S. Cl. ........................ 60/487; 91/495; 92/12.1; 92/58; 92/72; 417/221
[58] Field of Search ............. 60/484, 485, 487, 489; 91/494, 495; 92/12.1, 58, 72; 417/221, 223

[56] References Cited

U.S. PATENT DOCUMENTS

| | | | |
|---|---|---|---|
| 1,150,478 | 8/1915 | Zagora | 60/485 |
| 1,190,139 | 7/1916 | Ford | 60/485 |
| 2,221,308 | 11/1940 | Dischert | 60/489 |
| 2,940,260 | 6/1960 | Mylcraine | 60/484 |
| 4,179,888 | 12/1979 | Goscenski, Jr. | 60/484 X |
| 4,431,064 | 2/1984 | Bright | 60/484 X |

FOREIGN PATENT DOCUMENTS 221190 2/1925 United Kingdom ................ 60/489

*Primary Examiner*—Edward K. Look
*Assistant Examiner*—Hoang Nguyen
*Attorney, Agent, or Firm*—Fulbright & Jaworski

[57] ABSTRACT

A hydraulic power system having first and second hydraulic power converters in which the speed of the second power converter is proportional to the speed of the first power converter. The first hydraulic power converter includes a plurality of hydraulic power producing elements. At least one of the power producing elements provides power for power driving, and at least one of the power producing elements pumps hydraulic fluid. The hydraulic fluid is connected to and drives the second hydraulic power converter at a speed proportional to the speed of the first power converter.

4 Claims, 3 Drawing Sheets

HYDRAULIC POWER SYSTEM HAVING FIRST AND SECOND POWER CONVERTERS

BACKGROUND OF THE INVENTION

The present invention is directed to a hydraulic power system having two or more hydraulic power converters in which it is desired that the speed of one of the power converters changes proportional to the speed of another power converter.

It is well known that in many hydraulic power applications, it is very desirable and often imperative to link the speed of one hydraulic converter to the speed or feed rate of another hydraulic converter or actuator. For example, in a sawing application where a circular saw blade is driven by a rotary hydraulic converter or motor and a linear hydraulic actuator is used to feed the circular saw blade into the material to be cut, it is necessary to regulate the feed rate of the saw with the rotary speed of the saw. If the saw blade slows down and the feed rate is unchanged, then the saw blade can stall because the teeth of the blade are forced to take larger and larger bites per pass through the material.

Another example of the desirability of tying the feed rate to the speed of rotational motion is in the mining industry where roof bolt drilling is being performed. A drill bit being rotated by a rotary hydraulic converter is fed into the roof of a mine by a hydraulic linear actuator. It is very desirable to regulate the feed rate of the drill to the speed of the drill. In addition, drill rate can be improved and bit life improved if the feed rate can be oscillated; this can be accomplished by quickly increasing, then decreasing, the flow of fluid to the hydraulic linear actuator.

A third example of the desirability of linking the speed of two or more hydraulic converters is present in conveyor drives, where the speed of one rotary hydraulically powered conveyor can be tied to the speed of another conveyor. When one conveyor is heavily loaded, it will slow down when compared to a lightly loaded conveyor; this is so because the pressure of the fluid in the hydraulic converter heavily loaded is higher than the pressure in the converter of the lightly loaded conveyor; the higher pressure causes an excess of internal leakage in the hydraulic converter carrying a heavier load.

SUMMARY

The present invention is directed to a hydraulic power system having first and second hydraulic power converters in which the speed of the second converter is proportional to the speed of the first power converter. The first hydraulic power converter includes a plurality of hydraulic power producing elements. At least one of the power producing elements provides power for power driving and at least one of the power producing elements pumps hydraulic fluid. The hydraulic fluid from the first hydraulic power converter is connected to and drives the second hydraulic power converter at a speed proportional to the speed of the first power converter.

Another object of the present invention is the provision of a hydraulic power system having a rotary hydraulic power converter and a second hydraulic power converter in which the speed of the second power converter is desired to be proportional to the speed of the rotary power converter. The rotary power converter includes a rotor member and a stator member, said members being concentrically mounted and rotatable relative to each other about a common center. The members have opposing peripheries contoured to provide an annular space therebetween. Each of the peripheries of the rotor and stator includes a plurality of spaced radially extending rotor and stator slots, respectively, and each slot receives a vane therein. A fluid inlet is provided in the stator adjacent to one side of each stator slot and opens into the annular space. A fluid outlet is provided in the stator adjacent the second side of each stator slot and opens into the annular space. A hydraulic pump is connected to the fluid inlets and to at least one of the fluid outlets, and at least one of the fluid outlets is connected to and actuates said second hydraulic power converter.

Still a further object of the present invention is wherein the distance of the periphery of the stator from the common center is non-constant thereby providing a pulsating pumping action.

Still a further object of the present invention is wherein the rotary power converter powers a saw and the second power converter powers the feed of the saw.

Still a further object of the present invention is wherein the rotary power converter powers a drill and the second power converter powers the feed of the drill.

Yet a still further object of the present invention is wherein a rotary hydraulic power converter powers a first conveyor and a second power converter is a rotary hydraulic power converter which powers a second conveyor.

Yet a still further object of the present invention is a combination hydraulic pump and motor in one rotary hydraulic power converter wherein a fluid inlet connection is connected to the power converter and to all of the fluid inlets to the stator. A first fluid outlet connection is connected to the power converter and to at least one of the fluid outlets in the stator, while a second fluid outlet connection is connected to the power converter and to the stator and to at least one of the fluid outlets which are not connected to the first connection.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

The hydraulic power system of the present invention using first and second hydraulic power converters in which the speed of the second converter is made proportional to the speed of the first power converter is described as using a combination pump/motor rotary hydraulic power converter for purposes of illustration only. However, the present hydraulic power system may include any suitable type of hydraulic power converter such as a hydraulic piston engine having a plurality of hydraulic power producing elements wherein at least one of the power producing elements produces power for power driving and at least one of the power producing elements pumps hydraulic fluid, and the hydraulic fluid is connected to and drives the second hydraulic power converter. In addition, while the invention will be described in connection with certain specific applications, the present invention may be used in other types of applications having hydraulic power systems with a plurality of hydraulic power converters in which it is desired to link the speed of one hydraulic converter to the speed of another hydraulic converter.

Figure 1:
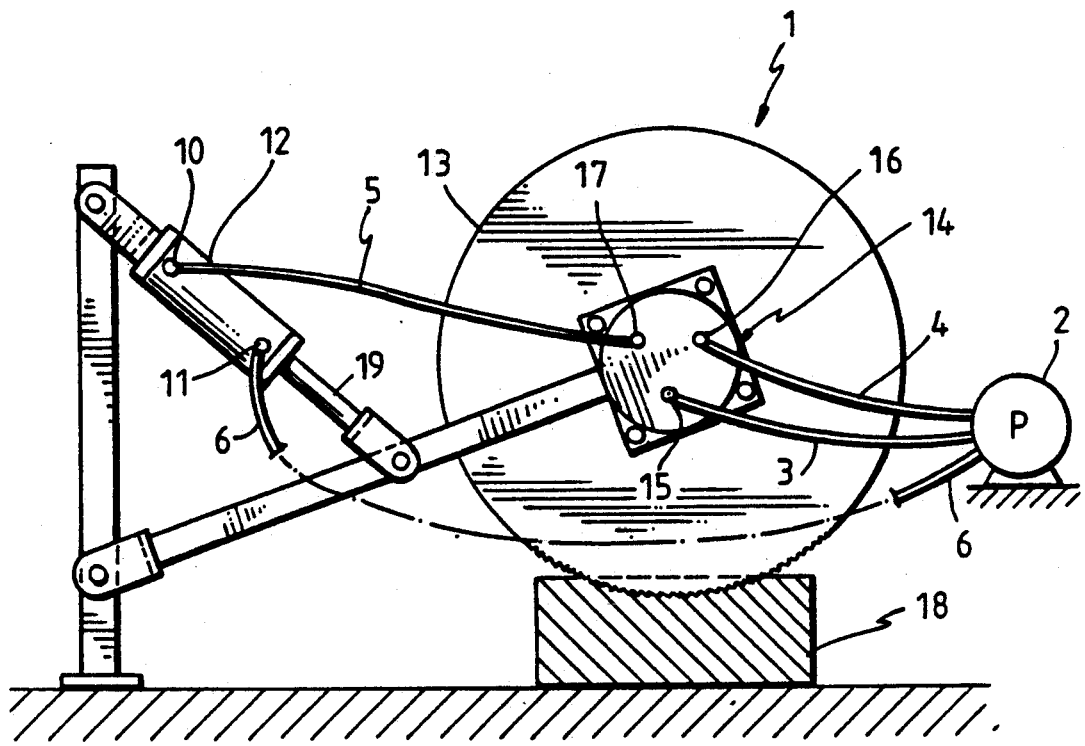
FIG. 1 is a schematic elevational view illustrating a circular saw which is powered by a hydraulic power system of the present invention.

Referring now to the drawings, and particularly to FIG. 1, the reference numeral 1 generally indicates the hydraulic power system of the present invention and includes a first hydraulic power converter 14, here shown as a combination pump/motor rotary hydraulic power converter, and a second hydraulic power converter 12, such as a linear fluid power actuator, which may be a hydraulic piston and cylinder assembly. The first power converter 14 drives a rotary saw 13 for sawing material 18. The second power converter 12 controls the feed rate of the saw 13 into the material 18. It is necessary to regulate the feed rate controlled by the second power actuator 12 with the rotary speed of the saw 13 which is controlled by the first rotary power converter 14. If the saw blade 13 slows down, and the feed rate is unchanged, then the saw blade 13 can stall because of the teeth of the blade are forced to take larger and larger bites through the material 18. A hydraulic pump system or source 2 which may include a reservoir is provided having an outlet hose 3 which is connected to the high pressure inlet port 15 of the converter 14. Port 16 is connected to the return line 4 of the pump 2. Therefore, flow of hydraulic fluid from the pump 2 through the line 3 causes the rotary power converter 14 to rotate the saw 13. However, a second outlet port 17 is provided in the rotary fluid power converter 14. The hydraulic outlet fluid from the port 17 flows through line 5 to the inlet port 10 of the linear actuator 12 so that the linear actuator rod 19 can be extended to feed the saw blade 13 into the workpiece or object 18. Outlet port 11 is connected through line 6 back to pump system or source 2. The rate of feed of the rod 19 of the linear actuator 12 is controlled by the amount of fluid which is supplied out of the outlet port 17 of the combination pump/motor rotary hydraulic converter 14. If the flow supplied from the port 17 is a percentage of the fluid supplied to the inlet port 15, the rate of feed of the linear actuator is in a direct relationship to the speed of the combination pump/motor converter 14 and thus the connected saw blade 13. As the flow rate of the fluid supplied to the inlet port 15 of the converter 14 is reduced, the speed of the converter 14 and the speed of the saw blade 13 are reduced, and the feed rate of the linear actuator rod 19 is reduced. Conversely, increasing the flow of fluid to the inlet port 15 will increase the speed of the converter 14 and proportionately increase the feed rate of the actuator 19. Thus, the hydraulic power system 1 of the present invention solves the typical problem of regulating the feed rate of the linear actuator to the speed of the saw blade 13, without depending upon a separate power source and complex feedback system to control the rate of feed of the linear actuator 12.

Figure 2:
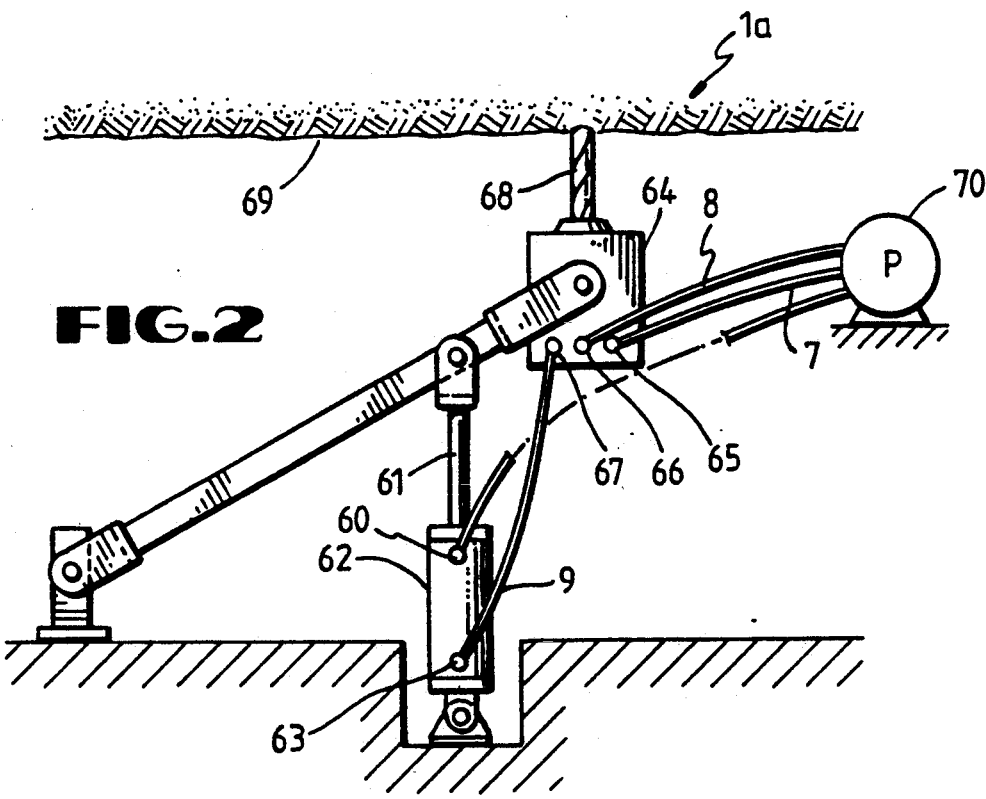
FIG. 2 is a schematic elevational view illustrating a roof bolt drill being powered by a hydraulic power system of the present invention.

Referring now to FIG. 2, the reference numeral 1a generally indicates another system in which 64 indicates a combination pump/motor rotary hydraulic power converter and the reference numeral 62 generally indicates a fluid power linear actuator. As fluid from an independent pump source 70 is supplied through hoses to inlet port 65 and outlet port 66, respectively, the combination pump/motor rotary hydraulic power converter 64 rotates a roof bolt drill 68. As the power converter 64 rotates, fluid is pumped out of another outlet port 67, which is connected to port 63 of the linear fluid actuator 62 through hose 9 causing rod 61 to extend pushing the roof bolt drill 68 into the roof of a mine 69. Outlet port 60 is connected to pump system or source 70. The feed rate of the rod 61 of the linear actuator 62 is controlled by the fluid supplied from the pump section of the combination pump/motor 64 via port 67. As the speed of the combination pump/motor 64 is varied, the feed rate of the linear actuator 62 is proportionately varied, thus solving the existing problem of linking the speed of the roof bolt drill bit 68 to the feed rate of the roof bolt drill bit 68.

Figure 3:
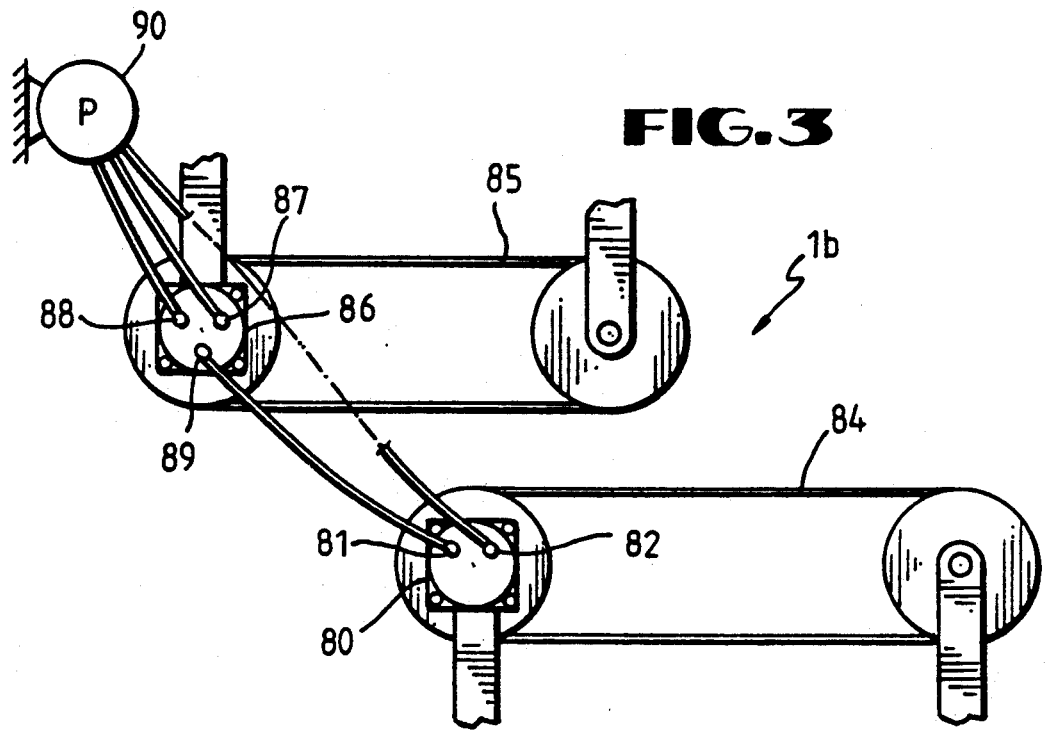
FIG. 3 is a schematic elevational view illustrating two conveyors which are powered by a hydraulic power system of the present invention for rotating the second conveyor at a speed proportional to the speed of the first conveyor.

Referring now to FIG. 3, a hydraulic power system 1b is shown having a first conveyor 84 and a second conveyor 85 which supplies articles onto the conveyor 84. Conveyor 85 is driven by a combination pump/motor rotary hydraulic power converter 86 and a rotary hydraulic power converter 80 drives the conveyor 84. A hydraulic pump source or system 90 supplies hydraulic fluid to the inlet port 88 of the hydraulic converter 86 and receives return fluid from the port 87, thereby rotating the converter 86 and the conveyor 85. A measured portion of the fluid supplied to the converter 86 is supplied from the pump section of the pump/motor of converter 86 through a hose from the port 89 to port 81 of the fluid power converter 80 while return port 82 is connected back to the pump source 90. Thus, the speed of the conveyor 84 is directly tied to the speed of conveyor 85 since the output of the port 89 is directly controlled by the speed of the power converter 86, thus synchronizing the speed of conveyors 85 and 84. As the conveyor 85 speeds up, conveyor 84 speeds up, and conversely as conveyor 85 slows down, conveyor 84 slows down.

Figure 4:
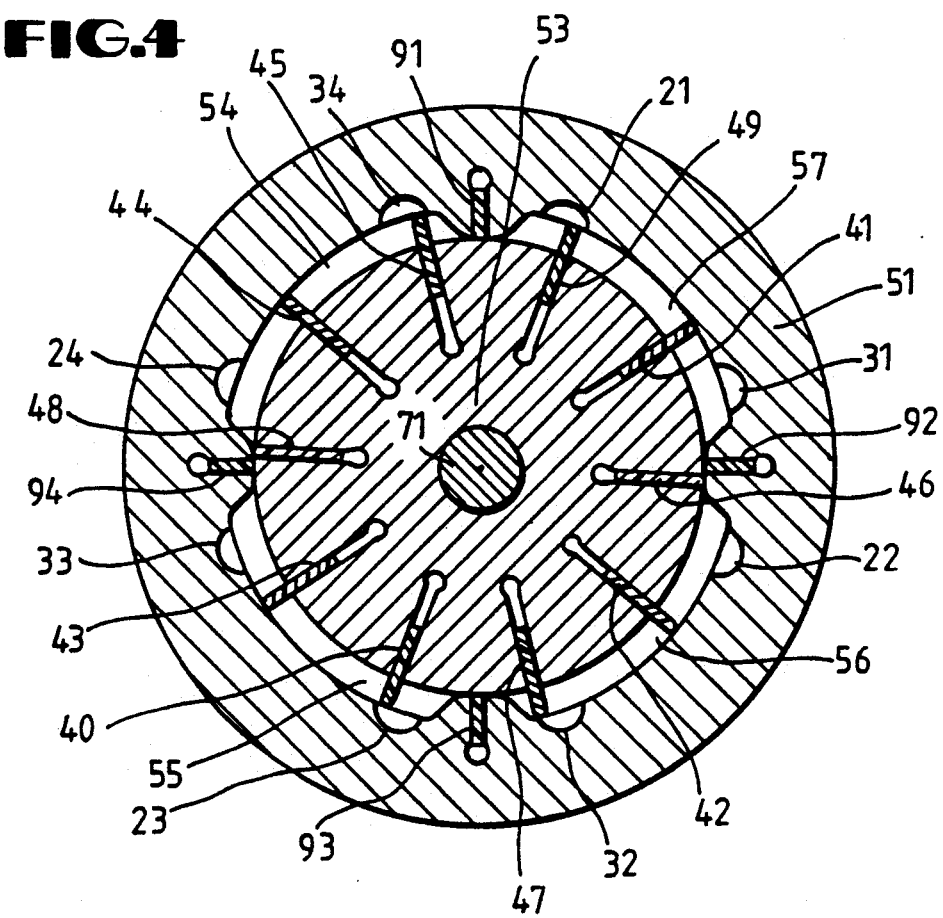
FIG. 4 is a schematic elevational view in cross section illustrating a combination pump/motor rotary hydraulic fluid power converter of the present invention.
Figure 5:
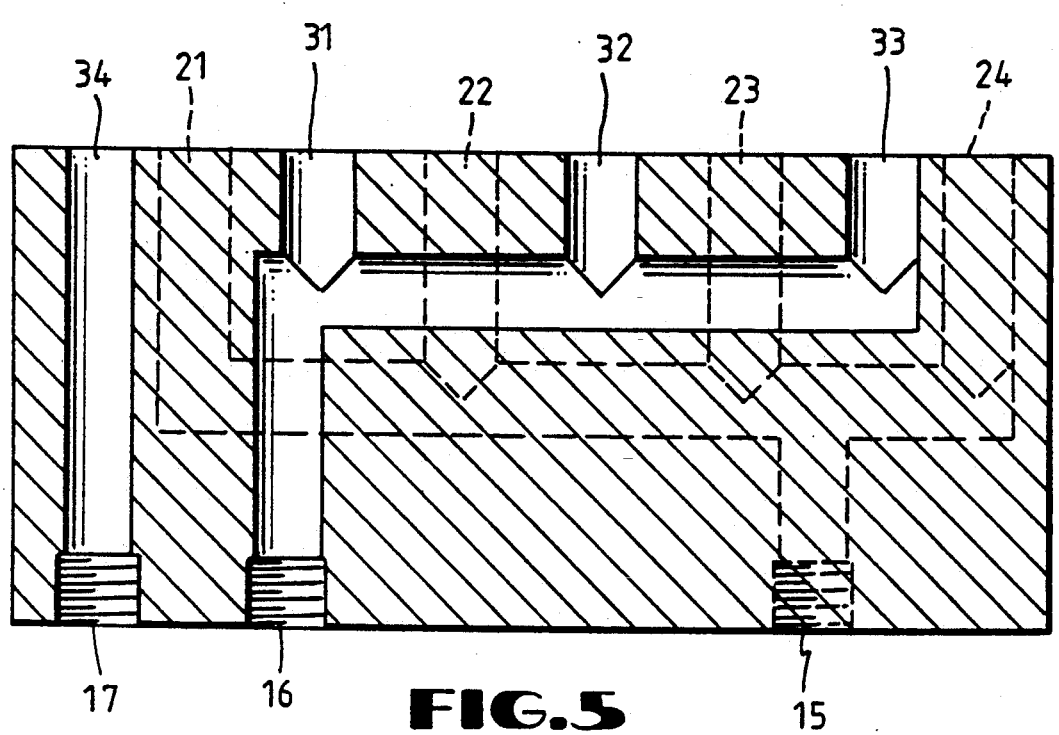
FIG. 5 is a schematic side elevational view of the converter of FIG. 4 illustrating the inlet and outlet connections.

Referring now to FIGS. 4 and 5, a suitable combination rotary hydraulic pump/motor suitable for use as the power converter 14 of FIG. 1 the power converter 64 of FIG. 2 or the power converter 86 of FIG. 3 is illustrated, but is described as used in FIG. 1.

The power converter shown in FIGS. 4 and 5 includes a stator member 51 and a rotor member 53, said members 51 and 53 being concentrically mounted and rotatable one with respect to the other about a common center 71. The stator 51 and rotor 53 have opposing peripheries contoured to provide an annular space therein consisting of cavities 54, 55, 56 and 57 spaced therebetween. Each of the peripheries of the stator 51 and rotor 53 include a plurality of spaced radially extending slots receiving a vane therein. Thus, the rotor 53 includes a plurality of slots including vanes 40, 41, 42, 43, 44, 45, 46, 47, 48, and 49. Stator 51 includes slots including vanes 91, 92, 93, and 94. A fluid inlet is provided in the stator 51 adjacent to one side of each of the stator slots and vanes and opens into the annular space such as fluid inlets 21, 22, 23 and 24. A fluid outlet is provided in the stator adjacent to the second side of each of the stator slots and vanes and opens into the annular space such as fluid outlets 31, 32, 33, and 34.

As best seen in FIG. 5, the inlet ports 21, 22, 23 and 24 are internally connected and are supplied with fluid from one of the independent pump sources through port 15. The outlet ports 31, 32 and 33 are connected to the outlet port 16 for return to the pump source or system 2 through hose 4. However, port 34 is internally connected to a separate output port 17 which in turn can be connected to a variety of linear actuators or rotary power converters. As ports 21, 22, 23, and 24 are supplied with fluid, from an independent pump source, such as 2, the rotor 53 rotates in a clockwise manner. Fluid which enters port 24 is pumped out through port 34 by a vane which is in vane position 44. Port 34 is mechanically separated from the fluid which enters the inlet ports 21, 22, 23 and 24. During each revolution of rotor 53, vanes 40, 41, 42, 43, 44, 45, 56, 47, 48, 49 displace the volume of fluid trapped in cavity 54 out of the pump/motor through port 34 for use as a pump. The volume of fluid in cavities 55, 56, 57 are returned through ports 31, 32 and 33 to the independent pump source 2. Assuming cavities 54, 55, 56 and 57 contain the same volume, 25% of the fluid supplied to common ports 21, 22, 23 and 24 is separated and pumped out port 34 while 75% of the fluid is returned to the independent pump source 2. As the volume of fluid from the independent pump is either increased or decreased to ports 21, 22, 23 and 24, the speed of the motor increases or decreases, and the rate of fluid pumped out through port 34 is increased or decreased at a predictable rate. Cavities 54, 55, 56 and 57 may have the same volume or different volume. Thus the ratio of motor to pump in the pump/motor converter is controllable. That is, the hydraulic pump 2 is connected to the fluid inlets 21, 22, 23 and 24 and to at least one of the fluid outlets, here shown as fluid outlets 31, 32 and 33, but at least one of the fluid outlets, here fluid outlet 34, is connected to and actuates the second hydraulic power converter.

Therefore, the present invention is directed to a combination hydraulic pump/motor in a single rotary hydraulic power converter which has multiple cavities 54, 55, 56 and 57, in which at least one cavity is used as a motor to power a rotary drive and while at least one other cavity is used to pump hydraulic fluid to another hydraulic fluid converter be it linear or rotary such as the feed to the linear hydraulic actuator 12 of FIG. 1 or the linear actuator 62 of FIG. 3 or to the rotary hydraulic converter 80 of FIG. 3. By way of example only, the rotary hydraulic converter 80 may be any suitable rotary hydraulic motor such as Model No. 015-61-008-31-20, sold by Rineer Hydraulics, Inc.

Figure 6:
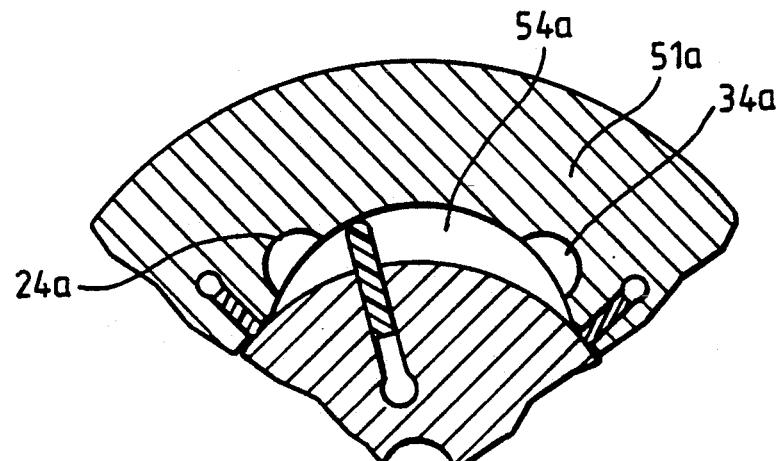
FIG. 6 is a fragmentary, schematic elevational view of a modified form of the power converter of FIG. 4 to provide a pulsating or oscillating type action.

As previously mentioned, it may be desirable to pulsate or oscillate the feed rate of one of the functions, such as the drill 68 of FIG. 2, which increases the drill rate and drill bit life. Referring to FIG. 4, it is noted that the periphery of the stator 51 in cavity 54, which supplies the fluid to the fluid outlet 34, is a constant radius with respect to the center 71, which causes the output through the port 34 and thus to the second fluid actuator to be a steady stream. However, in referring to FIG. 6, if the periphery of the stator 51a at the cavity 54a is altered, for example to an arc of a circle with respect to the center 71, then the volume of the cavity 54a will increase from port 24a to the midpoint of cavity 54a, then decrease in volume from the midpoint to port 34a, producing a pulsating stream of fluid. If this pulsating stream of fluid is supplied to port 63 of linear actuator 62 in FIG. 2, the feed rate of the drill 68 is oscillated or pulsed, thus creating what is known as impact drilling which reduces the time required to drill a hole. Thus, by making the inner periphery of the stator 51a a non-constant distance from the common center 71, a pulsating pumping action is provided.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. A hydraulic power system having a rotary hydraulic power converter and a second hydraulic power converter in which the speed of the second power converter is proportional to the speed of the rotary power converter and said rotary power converter and said second hydraulic power converter respectively drive first and second coacting mechanisms, comprising, the rotary hydraulic power converter includes a rotor member and a stator member, said members being concentrically mounted and rotatable relative to each other about a common center, said members having opposing peripheries contoured to provide an annular space therebetween, each of the peripheries of the rotor and stator includes a plurality of spaced radially extending rotor and stator slots, respectively, and each slot receiving a vane therein, a fluid inlet in the stator adjacent to one side of each stator slot and opening into the annular space, a fluid outlet in the stator adjacent a second side of each stator slot and opening into the annular space, a hydraulic pump system connected to said fluid inlets and to at least one of the fluid outlets, and at least one of the fluid outlets providing positive displacement fluid and is connected in series to and actuating said second hydraulic power converter at a speed proportional to the speed of the first converter whereby the second mechanism is driven at a speed proportional to the speed of the first mechanism, and wherein the rotary power converter powers a saw, and said second power converter powers the feed of said saw.

2. The power system of claim 1 wherein the distance of the periphery of the stator from the common center is non-constant thereby providing a pulsating pumping action.

3. A hydraulic power system having a rotary hydraulic power converter and a second hydraulic power converter in which the speed of the second power converter is proportional to the speed of the rotary power converter and said rotary power converter and said second hydraulic power converter respectively drive first and second coacting mechanisms, comprising, the rotary hydraulic power converter includes a rotor member and a stator member, said members being concentrically mounted and rotatable relative to each other about a common center, said members having opposing peripheries contoured to provide an annular space therebetween, each of the peripheries of the rotor and stator includes a plurality of spaced radially extending rotor and stator slots, respectively, and each slot receiving a vane therein, a fluid inlet in the stator adjacent to one side of each stator slot and opening into the annular space, a fluid outlet in the stator adjacent a second side of each stator slot and opening into the annular space, a hydraulic pump system connected to said fluid inlets and to at least one of the fluid outlets, and at least one of the fluid outlets providing positive displacement fluid and is connected in series to and actuating said second hydraulic power converter at a speed proportional to the speed of the first converter whereby the second mechanism is driven at a speed proportional to the speed of the first mechanism, and wherein the rotary power converter powers a drill and the second power converter powers the feed of said drill.

4. The power system of claim 3 wherein the distance of the periphery of the stator from the common center is non-constant for providing a pulsating pumping action.

* * * * *